(12) United States Patent
Dillenberger et al.

(10) Patent No.: US 8,259,099 B2
(45) Date of Patent: *Sep. 4, 2012

(54) USE OF THREE-DIMENSIONAL DATA CENTER TO SUPPORT SERVICING EXTERNAL OPERATIONS

(75) Inventors: Donna N. Dillenberger, Yorktown Heights, NY (US); Robert M. Greenberg, Raleigh, NC (US); Mark F. Hulber, New York, NY (US); Michael J. Osias, Westtown, NY (US)

(73) Assignee: International Business Machines Corporation, Armonk, NY (US)

( * ) Notice: Subject to any disclaimer, the term of this patent is extended or adjusted under 35 U.S.C. 154(b) by 812 days.

This patent is subject to a terminal disclaimer.

(21) Appl. No.: 11/750,141

(22) Filed: May 17, 2007

(65) Prior Publication Data

US 2008/0288505 A1 Nov. 20, 2008

(51) Int. Cl.
*G06T 15/00* (2011.01)
(52) U.S. Cl. ........................................ 345/419
(58) Field of Classification Search .................. None
See application file for complete search history.

(56) References Cited

U.S. PATENT DOCUMENTS

| | | | |
|---|---|---|---|
| 5,353,399 A | 10/1994 | Kuwamoto et al. | |
| 5,781,229 A | 7/1998 | Zediker et al. | |
| 5,884,029 A | 3/1999 | Brush, II et al. | |
| 5,958,012 A | 9/1999 | Battat et al. | |
| 5,999,208 A | 12/1999 | McNerney et al. | |
| 6,054,987 A | 4/2000 | Richardson | |
| 6,112,015 A | 8/2000 | Planas et al. | |
| 6,195,184 B1 | 2/2001 | Chao et al. | |
| 6,271,845 B1 | 8/2001 | Richardson | |
| 6,289,380 B1 | 9/2001 | Battat et al. | |
| 6,404,437 B1 | 6/2002 | Russell, II et al. | |
| 6,456,306 B1 | 9/2002 | Chin et al. | |
| 6,633,312 B1 | 10/2003 | Rochford et al. | |
| 6,809,738 B2 | 10/2004 | Hubrecht et al. | |
| 6,970,919 B1 | 11/2005 | Doi et al. | |
| 7,012,602 B2 | 3/2006 | Watson et al. | |
| 7,055,107 B1 | 5/2006 | Rappaport et al. | |
| 7,073,129 B1 | 7/2006 | Robarts et al. | |
| 7,197,193 B2 | 3/2007 | Li et al. | |

(Continued)

FOREIGN PATENT DOCUMENTS

WO 0150387 A1 7/2001

OTHER PUBLICATIONS

Raskar et al., "The Office of the Future: A Unified Approach to Image-Based Modeling and Spatially Immersive Displays," Jul. 1998, pp. 1-10, Computer Graphics Proceedings, Annual Conference Series, SIGGRAPH 98, Orlando.

(Continued)

*Primary Examiner* — Daniel Hajnik
(74) *Attorney, Agent, or Firm* — Hoffman Warnick LLC; Brian Verminski

(57) ABSTRACT

A solution for supporting servicing an outsource operation(s) using a three-dimensional (3D) data center is provided. In particular, a solution is provided in which a 3D data center is created from aggregating information technology (IT) resource data received from a plurality of outsourced operation locations that may be geographically or task distributed amongst multiple IT service providers.

16 Claims, 4 Drawing Sheets

U.S. PATENT DOCUMENTS

| | | | |
|---|---|---|---|
| 7,319,992 | B2 | 1/2008 | Gaos |
| 7,336,383 | B2 | 2/2008 | Kageyama |
| 7,386,628 | B1 * | 6/2008 | Hansell et al. ............... 709/238 |
| 7,487,228 | B1 | 2/2009 | Preslan et al. |
| 7,502,854 | B2 | 3/2009 | Luo et al. |
| 7,657,545 | B2 * | 2/2010 | Bird ........................... 707/999.1 |
| 7,681,131 | B1 | 3/2010 | Quarterman et al. |
| 2001/0019328 | A1 | 9/2001 | Schwuttke et al. |
| 2001/0051913 | A1 * | 12/2001 | Vashistha et al. ............... 705/37 |
| 2002/0013837 | A1 | 1/2002 | Battat et al. |
| 2002/0113820 | A1 | 8/2002 | Robinson et al. |
| 2002/0134985 | A1 | 9/2002 | Chen et al. |
| 2002/0135610 | A1 | 9/2002 | Ootani et al. |
| 2003/0028269 | A1 | 2/2003 | Spriggs et al. |
| 2003/0033402 | A1 | 2/2003 | Battat et al. |
| 2003/0212775 | A1 | 11/2003 | Steele et al. |
| 2004/0120021 | A1 | 6/2004 | Kihara et al. |
| 2005/0039132 | A1 | 2/2005 | Germain et al. |
| 2005/0052714 | A1 | 3/2005 | Klug et al. |
| 2005/0162721 | A1 | 7/2005 | Kihara et al. |
| 2005/0183041 | A1 | 8/2005 | Chiu et al. |
| 2006/0090136 | A1 | 4/2006 | Miller et al. |
| 2006/0171538 | A1 | 8/2006 | Larson et al. |
| 2006/0248159 | A1 | 11/2006 | Polan et al. |
| 2006/0271563 | A1 | 11/2006 | Angelo et al. |
| 2006/0277080 | A1 * | 12/2006 | DeMartine et al. ............... 705/7 |
| 2007/0027973 | A1 | 2/2007 | Stein et al. |
| 2007/0067435 | A1 | 3/2007 | Landis et al. |
| 2007/0136788 | A1 | 6/2007 | Monahan et al. |
| 2007/0174777 | A1 | 7/2007 | Finley et al. |
| 2007/0198695 | A1 | 8/2007 | Engelmann et al. |
| 2007/0213956 | A1 | 9/2007 | Nasle et al. |
| 2007/0219645 | A1 | 9/2007 | Thomas et al. |
| 2007/0233839 | A1 | 10/2007 | Gaos |
| 2008/0043760 | A1 * | 2/2008 | Venkatraman et al. ....... 370/401 |
| 2008/0049013 | A1 | 2/2008 | Nasle |
| 2008/0062167 | A1 | 3/2008 | Boggs et al. |
| 2008/0126110 | A1 * | 5/2008 | Haeberle et al. ................... 705/1 |
| 2008/0281912 | A1 | 11/2008 | Dillenberger et al. |
| 2008/0282242 | A1 | 11/2008 | Dillenberger et al. |
| 2010/0083148 | A1 | 4/2010 | Finn et al. |

OTHER PUBLICATIONS

Guleyupoglu et al., "Distributed Collaborative Virtual Reality Framework for System Prototyping and Training," Oct. 2000, pp. 29-1-29-8, RTO IST Symposium, Published in RTO MP-049.

Dillenberger et al., U.S. Appl. No. 11/747,147, filed May 10, 2007, Office Communication dated Nov. 19, 2009, 20 pages.
Dillenberger et al., U.S. Appl. No. 11/747,147, filed May 10, 2007, Office Communication dated Apr. 7, 2010, 22 pages.
Dillenberger et al., U.S. Appl. No. 11/747,157, filed May 10, 2007, Office Communication dated Nov. 19, 2009, 18 pages.
Dillenberger et al., U.S. Appl. No. 11/747,157, filed May 10, 2007, Office Communication dated Mar. 25, 2010, 17 pages.
Dillenberger et al., U.S. Appl. No. 11/747,182, filed May 17, 2007, Office Communication dated Dec. 3, 2009, 15 pages.
Dillenberger et al., U.S. Appl. No. 11/747,182, filed May 17, 2007, Notice of Allowance and Fee(s) Due dated Apr. 21, 2010, 17 pages.
Dillenberger et al., U.S. Appl. No. 11/750,216, filed May 17, 2007, Office Communication dated Apr. 5, 2010, 10 pages.
Hajnik, U.S. Appl. No. 11/747,182, Notice of Allowance & Fees Due, Jul. 16, 2010, 24 pages.
Wang et al., "Integrating Java 3D model and sensor data for remote monitoring and control", Robotics and computer Integrated Manufacturing, 19, 2003, 13-19, 7 pages.
Hajnik, U.S. Appl. No. 11/747,147, Office Action Communication, Sep. 21, 2010, 25 pages.
Hajnik, U.S. Appl. No. 11/747,157, Office Action Communication, Dec. 2, 2010, 28 pages.
Wong, U.S. Appl. No. 11/750,216, Office Action Communication, Oct. 1, 2010, 22 pages.
Daniel F. Hajnik, PTO Final Office Action, U.S. Appl. No. 11/747,157, Notification Date Apr. 18, 2011, 19 pages.
Daniel F. Hajnik, PTO Final Office Action, U.S. Appl. No. 11/747,147, Notification Date Feb. 22, 2011, 18 pages.
Wong, U.S. Appl. No. 11/750,216, Office Action Communication, Jul. 6, 2011, 17 pages.
Wong, U.S. Appl. No. 11/750,216, Office Action Communication, Dec. 21, 2011, 19 pages.
Hajnik, U.S. Appl. No. 11/747,147, Office Action Communication, Dec. 30, 2011, 28 pages.
Hajnik, U.S. Appl. No. 11/747,157, Office Action Communication, Feb. 27, 2012, 28 pages.
Hajnik, U.S. Appl. No. 11/747,147, Office Action Communication, May 1, 2012, 29 pages.
Hajnik, U.S. Appl. No. 11/747,157, Notice of Allowance & Fees Due, Jun. 14, 2012, 13 pages.

* cited by examiner

USE OF THREE-DIMENSIONAL DATA CENTER TO SUPPORT SERVICING EXTERNAL OPERATIONS

CROSS-REFERENCE TO RELATED APPLICATIONS

This application is related in some aspects to commonly owned patent application Ser. No. 11/747,147, entitled "HOLOGRAPHIC ENTERPRISE NETWORK", filed May 10, 2007, the entire contents of which are herein incorporated by reference.

This application also is related in some aspects to commonly owned patent application Ser. No. 11/747,157, entitled "VIRTUAL NETWORK OPERATIONS CENTER", filed May 10, 2007, the entire contents of which are herein incorporated by reference.

This application also is related in some aspects to commonly owned patent application Ser. No. 11/747,182, entitled "MANAGEMENT OF ENTERPRISE SYSTEMS AND APPLICATIONS USING THREE-DIMENSIONAL VISUALIZATION TECHNOLOGY", filed May 10, 2007, the entire contents of which are herein incorporated by reference.

This application also is related in some aspects to commonly owned patent application Ser. No. 11/750,216, entitled "USE OF A THREE-DIMENSIONAL (3-D) DATA CENTER TO SHARE SERVICE OPERATIONS", filed concurrently herewith, the entire contents of which are herein incorporated by reference.

FIELD OF THE INVENTION

The invention relates generally to the outsourcing of operations, and more particularly to the use of a three-dimensional data center to support servicing outsourced operations.

BACKGROUND OF THE INVENTION

As the global economy grows, so too has the advent of companies outsourcing part, or all, of their operations, typically due to costs. With outsourcing, however, comes the concomitant reduction in insight and control by the company of the operation(s) that have been outsourced. This is frequently done in the area of information technology (IT) services. Companies attempt to address these shortcomings with various approaches including: meeting more frequently with the service provider for status updates; dedicating company resources (e.g., personnel) to work physically alongside in the datacenter that the operation(s) is outsourced to; and/or, creating customized software to measure the service provider's progress.

With all of these approaches, come drawbacks. For example, with more frequent meetings, often the company that has outsourced their operation(s) wants even more status and/or deeper insight to the outsourced task(s) than the meetings accord. Allocating company people to work (e.g., monitor, manage, etc.) alongside the working outsource operations is costly. With customized software (e.g., IT Dashboard) developed and defined at the start of the outsourcing engagement often becomes obsolete over the time that the oursourcing is conducted.

Accordingly, a need exists for a solution that addresses at least one of the aforementioned shortcomings in resource outsourcing.

BRIEF SUMMARY OF THE INVENTION

Aspects of the invention provide a solution for supporting servicing an outsource operation(s) using a three-dimensional (3D) data center is provided. In particular, a solution is provided in which a 3D data center is created from aggregating information technology (IT) resource data received from a plurality of outsourced operation locations that may be geographically or task distributed amongst multiple IT service providers.

A first aspect of the invention provides a method of servicing an outsourced operation, the method comprising: receiving information technology (IT) resource data from a plurality of outsourced operation locations, wherein the IT resource data includes elements that the outsourced operation is managing; aggregating the IT resource data from the plurality of outsourced operation locations; creating a three-dimensional simulation of the aggregated IT resource data; and using the three-dimensional simulation to service the outsourced operation.

A second aspect of the invention provides a system for servicing an outsourced operation, the system comprising: a system for receiving information technology (IT) resource data from a plurality of outsourced operation locations, wherein the IT resource data includes elements that the outsourced operation is managing; a system for aggregating the IT resource data from the plurality of outsourced operation locations; a system for creating a three-dimensional simulation of the aggregated IT resource data; and a system for using the three-dimensional simulation to service the outsourced operation.

A third aspect of the invention provides a computer program comprising program code stored on a computer-readable medium, which when executed, enables a computer system to implement a method of servicing an outsourced operation, the method comprising: receiving information technology (IT) resource data from a plurality of outsourced operation locations, wherein the IT resource data includes elements that the outsourced operation is managing; aggregating the IT resource data from the plurality of outsourced operation locations; creating a three-dimensional simulation of the aggregated IT resource data; and using the three-dimensional simulation to service the outsourced operation.

A fourth aspect of the invention provides a method of generating a system for servicing an outsourced operation, the method comprising: providing a computer system operable to: receive information technology (IT) resource data from a plurality of outsourced operation locations, wherein the IT resource data includes elements that the outsourced operation is managing; aggregate the IT resource data from the plurality of outsourced operation locations; create a three-dimensional simulation of the aggregated IT resource data; and use the three-dimensional simulation to service the outsourced operation.

The various aspects of the invention can be implemented as part of a business method for managing the servicing of an outsourced operation, in which payment is received in return for implementing, utilizing, and/or managing aspects of the invention.

The illustrative aspects of the invention are designed to solve one or more of the problems herein described and/or one or more other problems not discussed.

DETAILED DESCRIPTION

Embodiments of this disclosure are directed to a solution for using a three-dimensional (3D) data center to support servicing outsourced operations. The visual representations of the information technology (IT) elements includes items such as servers, racks, networking equipment, cabling, and power and cooling, whereas software elements are visualized in terms of the structure of the underlying software or in logical terms of their business function. These elements are structurally organized into a 3D simulation, such as a virtual data center. This virtual data center provides platform(s) for equipment, observation decks and catwalks, display screens, and various infrastructures such as the in-world communications gear.

Aspects of the present invention ultimately allow the servicing of outsourced operations, regardless of whether the outsourced operations are serviced (e.g., managed) by one, two, or a multitude of service providers (e.g., vendors) located in geographically distributed locations throughout the globe and/or task distributed to multiple locations and/or outsource operation providers. The user (e.g., client, other vendors, etc.) ultimately through the use of the 3D simulation (e.g., data center) is able to service (e.g., monitor, manage, and operate) the various outsourced operations (e.g., IT operations) from the central location of the 3D simulation (e.g., data center).

The 3D simulation allows a client to check status, metrics, and/or implementation of the various outsourced operations, at will and in near-real time. The 3D representation is kept up to date because it mirrors the physical IT assets (e.g., machines, software, cabling, processes, etc.) that are being used to run the outsourced operation. The 3D simulation (e.g., data center) is connected with the plurality of physical data centers hosting the outsourced operations with software monitoring the physical machines, software, and/or IT processes that the service provider (e.g., vendor) is using for the outsourced operations. The software aggregates the disparate sources of data, applies logic to the data so as to render 3D simulations that are easy to understand and manipulate.

Figure 1:
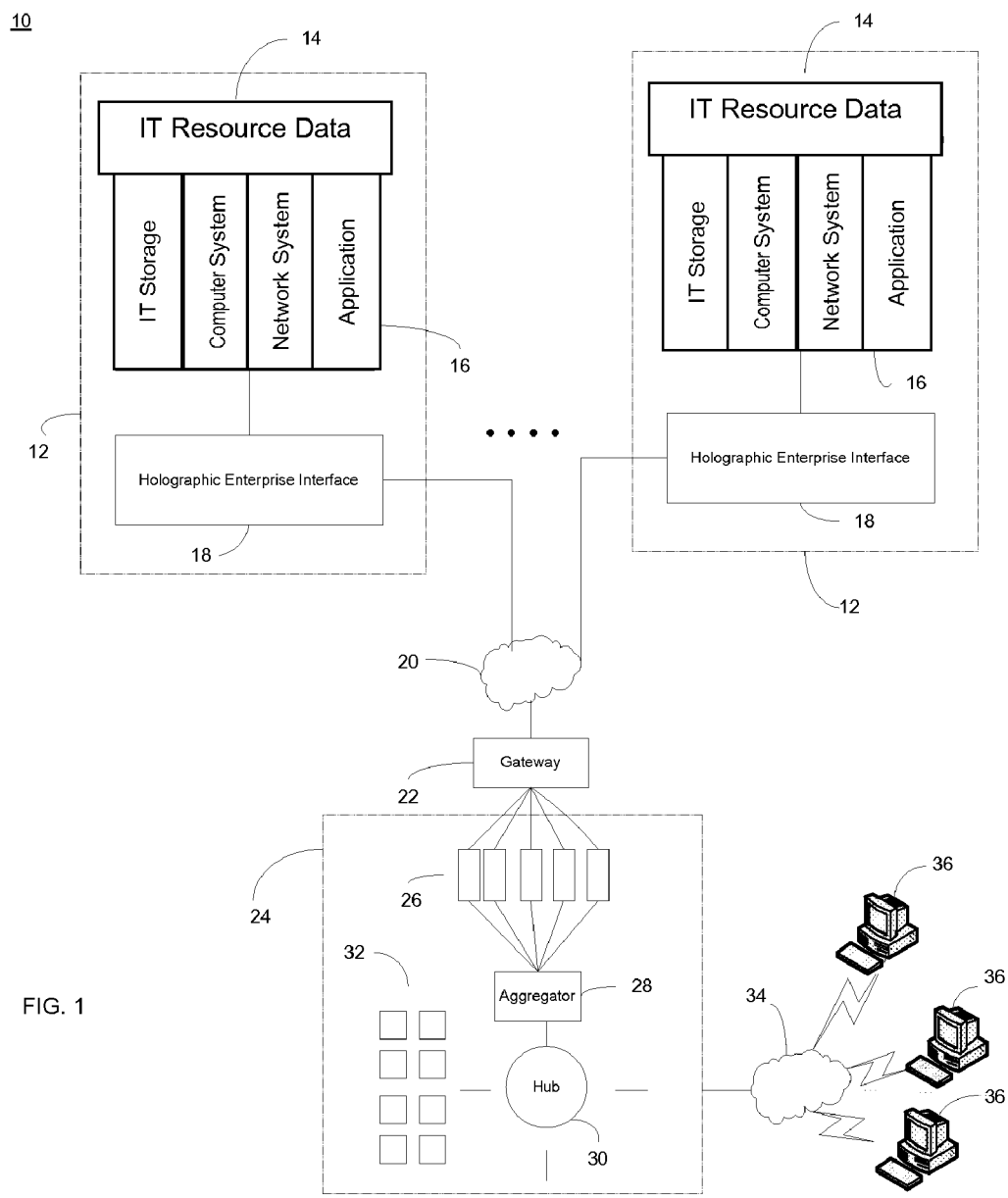
FIG. 1 shows a high-level schematic diagram showing an architectural overview of a system for using a three-dimensional data center to support the servicing of outsourced operations according to one embodiment of this disclosure.

FIG. 1 shows a high-level schematic diagram showing an architectural overview of a system 10 for servicing an outsourced operation using a 3D data center according to one embodiment of this disclosure. As shown in FIG. 1, the system comprises a plurality of outsourced operation locations 12. Each outsourced operation location 12 is responsible for servicing (e.g., managing, running, operating, etc.) at least one IT resource 16 of an enterprise. The IT resources 16 include elements such as at least one of IT storage system (e.g., server farms, etc.), a computer system, a network system, and applications. Derived from the at least one element 16 is IT resource data 14 from which the 3D simulation is created. Within each of the datacenters is system management software (not shown) that manages the hardware and software elements. In one embodiment, the system management software includes a plurality of commercially available back-end enterprise systems that are used to manage hardware and software elements within an enterprise.

A holographic enterprise interface 18 is deployed at outsourced operation location 12. In one embodiment, the holographic enterprise interface 18 is a plugin based component, where the plugins connect to the system management software or more specifically, to each of the back-end enterprise systems. In operation, the holographic enterprise interface transforms information from the application programming interfaces of the back-end enterprise systems into event data which is subsequently dispatched to the manager of the holographic enterprise interface 18. In one embodiment, the plugins are subclassed from a plugin base class which contains interfaces for managing the plugin instances.

The plugin manager within the holographic enterprise interface 18 routes the plugin generated events to the underlying communications systems within the holographic enterprise interface. The plugin manager also parses an XML configuration file that is the plugin descriptor defining what plugins to load. The communications system within the holographic enterprise interface 18 contains components for encoding event data from the plugins into a Holographic Protocol Architecture. The Holographic Protocol Architecture (HPA) is a protocol specification that defines packet types and conversation patterns necessary to interact with a 3D simulation (e.g., data center) 24 via a communications network 20 and gateway 22. The HPA comprises a packet header detailing the packet type (4 bytes), sequence number (2 bytes), total packets (2 bytes), and a location id (2 bytes).

After the packet header is a tuple based data payload of varying length, based on constraints that may be introduced by the underlying transport. The communications system within the holographic enterprise interface 18 includes a protocol handler that encodes the data from an event system into the HPA. It also decodes the protocol and dispatches events to plugins when receiving communications from the 3D simulation (e.g., data center) 24. In addition, there is a packet driver that uses a pluggable cipher component to encrypt the packet. It then interfaces with a pluggable transport provider, such as XML-RPC, to dispatch the communications to the 3D simulation (e.g., data center) 24.

The following configuration enables the 3D simulation (e.g., data center) 24 to operate in synchronous or asynchronous mode with the holographic interface element 18 depending on the underlying transport. In synchronous mode, queuing mechanisms are used to batch transmissions inbound to the holographic interface element 18 from the 3D simulation (e.g., data center) 24. In the event of a stateless synchronous transport, the queued data is encoded into the response to the XML-RPC call, and processed by the communications system within the holographic interface element 18.

The 3D simulation 24 which in one embodiment is a IT data center that structurally organizes IT elements of the plurality of outsourced operation locations into a 3D space. Although FIG. 1 shows the 3D simulation 24 separate from the outsourced operation locations 12, the 3D simulation 24 may exist at one of the location or at another third party location such as a hosting provider.

In any event the detailed operation of the elements including elements 20 through 36 are not described in detail herein, in the interest of brevity. A more detailed description is provided in the common assigned cross-referenced related applications. In any event, the outsourced operation locations may be each distributed either by task and/or geographically. For example, a first location 12 may be operated by a first IT service provider that specializes in a single aspect of IT expertise (e.g., networking). Conversely, at a second location 12 an IT service provider may be servicing another aspect of IT for the client (e.g., applications). As shown, in FIG. 1, at each location 12 one or more elements 16 (e.g., IT storage system, computer systems, network systems, and/or applications) may be service by an outsourced operation. Each location 12 may be geographically dispersed, or not. In any event, the aggregator may monitor one of the IT elements.

In any event, from the elements IT resource data 14 is received. IT resource data 14 may comprise receiving status of one of physical machines, software, and/or processes of the outsourced operation; checking metrics of the outsourced operation; and/or implementing an operation of the outsourced operation. The implementing step allows a client user to, via the use of the 3D simulation, to service (e.g., operate, manage, direct, etc) the physical IT elements at the various outsourced operation locations regardless of whether they are operated by one, or a plurality of outsource operators (e.g., vendors). The status may comprise one of: utilization of a server, memory usage of a server, and/or the number of transactions an application is supporting. Similarly, the metric may comprise one of response time of an application, and availability measurement of an application. In this manner, a user (e.g., client) may more readily support servicing outsourced operation(s).

Figure 2:
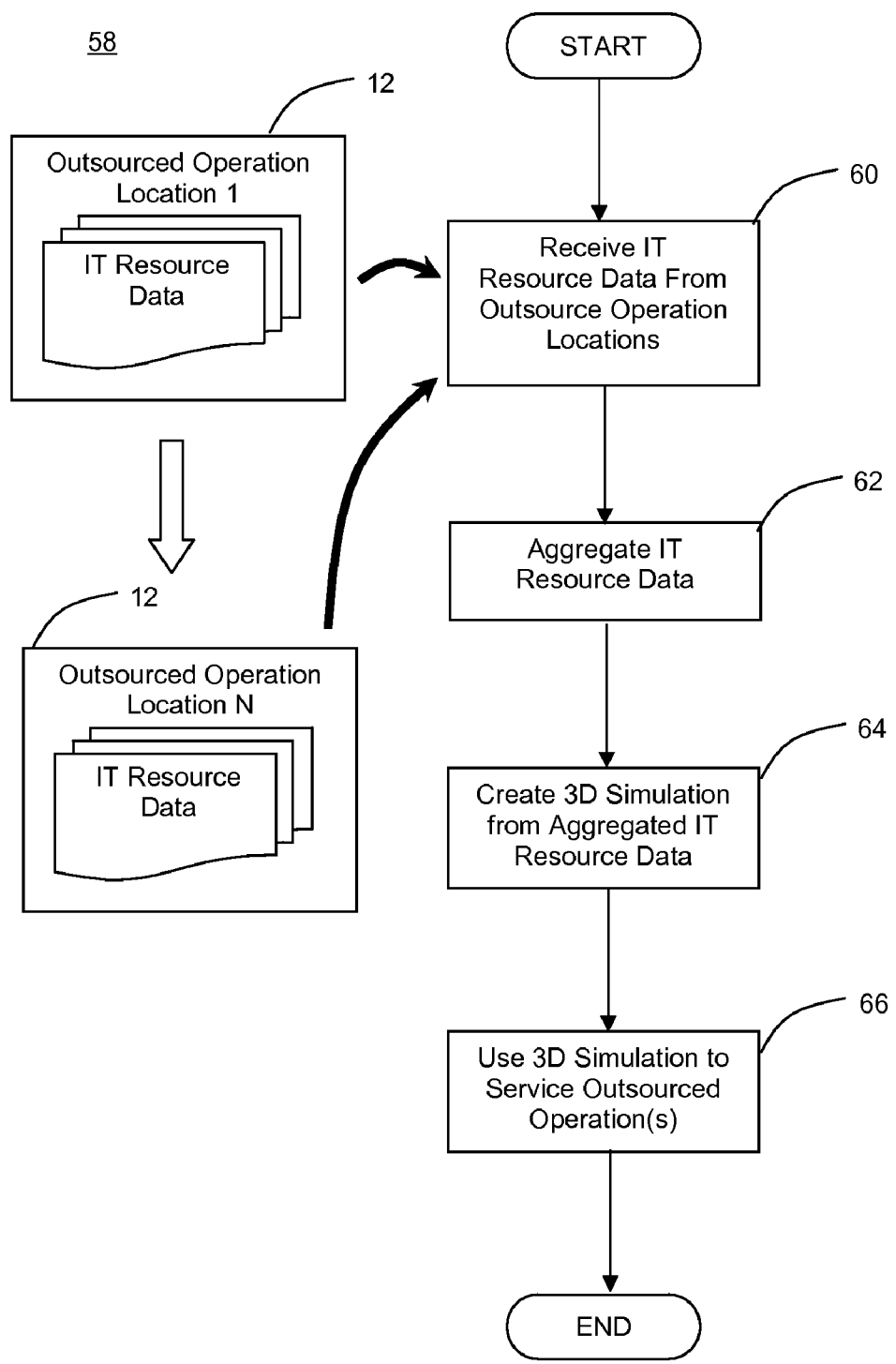
FIG. 2 shows a flow chart describing the operation of the system shown in FIG. 1.

FIG. 2 shows a flow chart 58 describing the operation of the system shown in FIG. 1 according to one embodiment. In FIG. 2, the process begins at 60 wherein IT resource data from the plurality of outsourced operation locations 12 is received. As depicted the plurality of outsourced operation locations 12 may be task distributed and/or geographically distributed. The quantity of outsourced operation locations 12 may any quantity from one to a near infinite quantity of locations. The IT resource data is aggregated from the plurality of outsourced operation locations at 62. The 3D simulation is created at 64 being representative of the aggregated IT resource data. The 3D simulation to service the various outsourced operations is used at 66. While the 3D simulation may typically be used by the client, other users certainly can use the simulation, including the various outsourced operators (e.g., vendors). The visualization comprises a three-dimensional composite visual image of the current operation of the plurality of outsourced operation locations serviced by one, or more, outsource operations. This visual image can be rendered by the user and provide a simple and integrated overall understanding of the enterprise in real-time.

The foregoing flow chart shows some of the processing functions associated with the 3D simulation 24. In this regard, each block represents a process act associated with performing these functions. It should also be noted that in some alternative implementations, the acts noted in the blocks may occur out of the order noted in the figure or, for example, may in fact be executed substantially concurrently or in the reverse order, depending upon the act involved. Also, one of ordinary skill in the art will recognize that additional blocks that describe the processing functions may be added.

Figure 3:
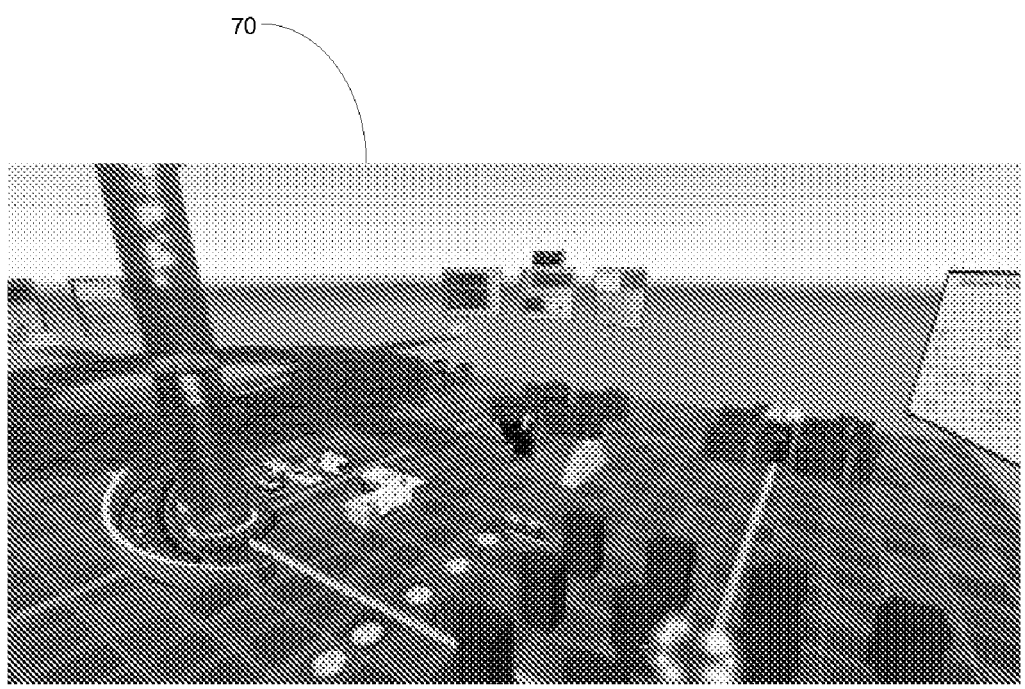
FIG. 3 provides a rendering of a three-dimensional simulation (e.g., data center) generated from the system shown in FIG. 1.

FIG. 3 provides a rendering 70 of a 3D simulation (e.g., data center) that shows components of an enterprise generated from the system 10 shown in FIG. 1. In particular, the visualization shows key components of the enterprise. As shown in FIG. 3, screens, displays, and data towers are positioned in strategic locations around the command center for providing an overall understanding of the enterprise. The screens, displays, and data towers consume data from the virtual network and determine what types of information to display to the enterprise manager and other personnel responsible for managing the enterprise.

In another embodiment of this disclosure, the 3D simulation (e.g., data center) 24 could be used as a service to charge fees for servicing an outsourced operation using a 3D data center. In this embodiment, the provider of the 3D simulation (e.g., data center) 24 or even the system 10 could offer these systems as a service by performing the functionalities described herein on a subscription and/or fee basis. In this case, the provider can create, deploy, maintain, support, etc., the 3D simulation (e.g., data center) 24 or the system 10 that performs the processes described in the disclosure.

In still another embodiment, the methodologies disclosed herein can be used within a computer system to service a plurality of outsourced operations using a 3D data center. In this case, the system 10 including the 3D simulation (e.g., data center) 24 can be provided and one or more systems for performing the processes described in the disclosure can be obtained and deployed to a computer infrastructure. To this extent, the deployment can comprise one or more of (1) installing program code on a computing device, such as a computer system, from a computer-readable medium; (2) adding one or more computing devices to the infrastructure; and (3) incorporating and/or modifying one or more existing systems of the infrastructure to enable the infrastructure to perform the process actions of the disclosure.

Figure 4:
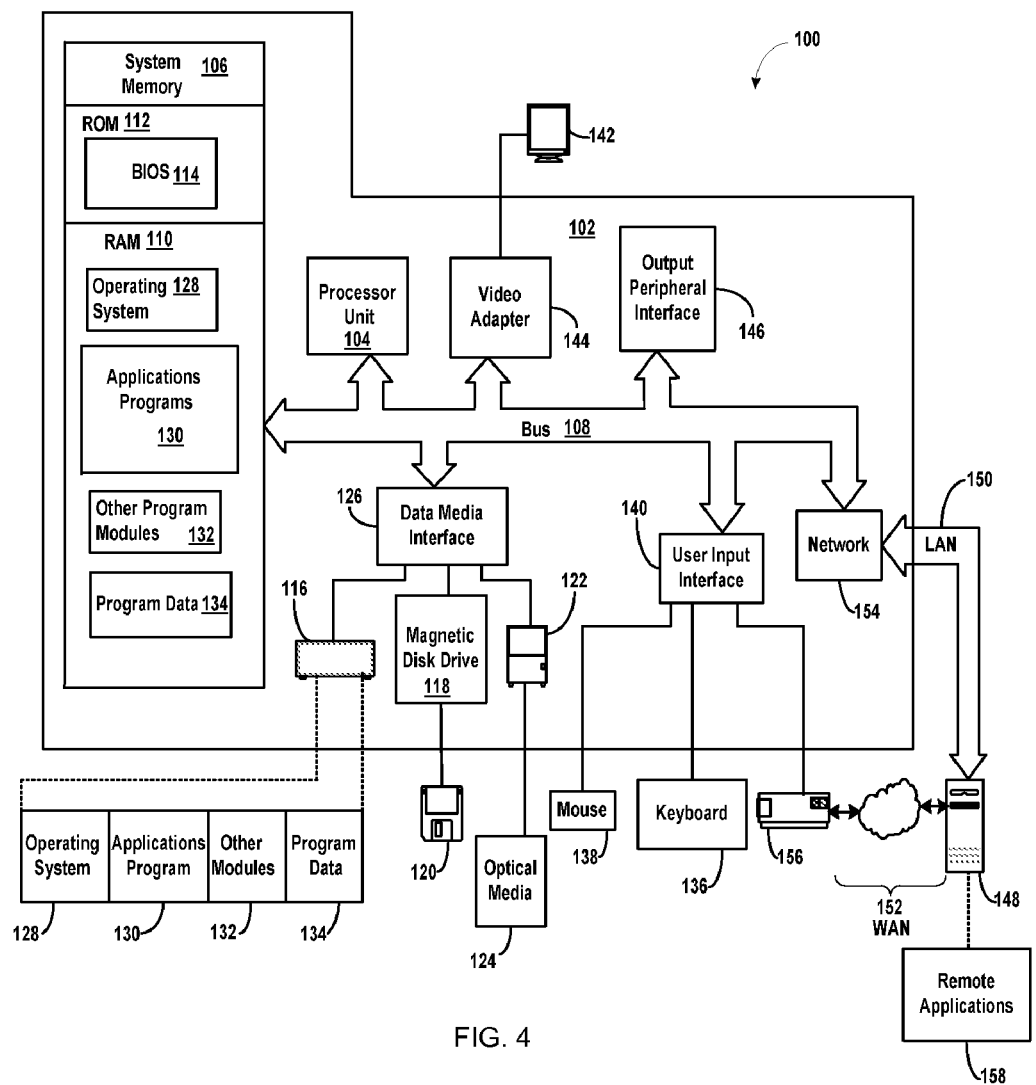
FIG. 4 shows a schematic of a computing environment in which elements of the system shown in FIG. 1 may operate.

FIG. 4 shows a schematic of a computing environment 100 in which elements of the system shown in FIG. 1 may operate. The exemplary computing environment 100 is only one example of a suitable computing environment and is not intended to suggest any limitation as to the scope of use or functionality of the approach described herein. Neither should the computing environment 100 be interpreted as having any dependency or requirement relating to any one or combination of components illustrated in FIG. 4.

In the computing environment 100 there is a computer 102 which is operational with numerous other general purpose or special purpose computing system environments or configurations. Examples of well known computing systems, environments, and/or configurations that may be suitable for use with an exemplary computer 102 include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary computer 102 may be described in the general context of computer-executable instructions, such as program modules, being executed by a computer. Generally, program modules include routines, programs, objects, components, logic, data structures, and so on, that performs particular tasks or implements particular abstract data types. The exemplary computer 102 may be practiced in distributed computing environments where tasks are performed by remote processing devices that are linked through a communications network. In a distributed computing environment, program modules may be located in both local and remote computer storage media including memory storage devices.

As shown in FIG. 4, the computer 102 in the computing environment 100 is shown in the form of a general-purpose computing device. The components of computer 102 may include, but are not limited to, one or more processors or processing units 104, a system memory 106, and a bus 108 that couples various system components including the system memory 106 to the processor 104.

Bus 108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 102 typically includes a variety of computer readable media. Such media may be any available media that is accessible by computer 102, and it includes both volatile and non-volatile media, removable and non-removable media.

In FIG. 4, the system memory 106 includes computer readable media in the form of volatile memory, such as random access memory (RAM) 110, and/or non-volatile memory, such as ROM 112. A BIOS 114 containing the basic routines that help to transfer information between elements within computer 102, such as during start-up, is stored in ROM 112. RAM 110 typically contains data and/or program modules that are immediately accessible to and/or presently operated on by processor 104.

Computer 102 may further include other removable/non-removable, volatile/non-volatile computer storage media. By way of example only, FIG. 4 illustrates a hard disk drive 116 for reading from and writing to a non-removable, non-volatile magnetic media (not shown and typically called a "hard drive"), a magnetic disk drive 118 for reading from and writing to a removable, non-volatile magnetic disk 120 (e.g., a "floppy disk"), and an optical disk drive 122 for reading from or writing to a removable, non-volatile optical disk 124 such as a CD-ROM, DVD-ROM or other optical media. The hard disk drive 116, magnetic disk drive 118, and optical disk drive 122 are each connected to bus 108 by one or more data media interfaces 126.

The drives and their associated computer-readable media provide nonvolatile storage of computer readable instructions, data structures, program modules, and other data for computer 102. Although the exemplary environment described herein employs a hard disk 116, a removable magnetic disk 118 and a removable optical disk 122, it should be appreciated by those skilled in the art that other types of computer readable media which can store data that is accessible by a computer, such as magnetic cassettes, flash memory cards, digital video disks, RAMs, ROM, and the like, may also be used in the exemplary operating environment.

A number of program modules may be stored on the hard disk 116, magnetic disk 120, optical disk 122, ROM 112, or RAM 110, including, by way of example, and not limitation, an operating system 128, one or more application programs 130, other program modules 132, and program data 134. Each of the operating system 128, one or more application programs 130, other program modules 132, and program data 134 or some combination thereof, may include an implementation of the system 10 shown in FIG. 1 for supporting servicing an outsourced operation using a 3D data center.

A user may enter commands and information into computer 102 through optional input devices such as a keyboard 136 and a pointing device 138 (such as a "mouse"). Other input devices (not shown) may include a microphone, joystick, game pad, satellite dish, serial port, scanner, camera, or the like. These and other input devices are connected to the processor unit 104 through a user input interface 140 that is coupled to bus 108, but may be connected by other interface and bus structures, such as a parallel port, game port, or a universal serial bus (USB).

An optional monitor 142 or other type of display device is also connected to bus 108 via an interface, such as a video adapter 144. In addition to the monitor, personal computers typically include other peripheral output devices (not shown), such as speakers and printers, which may be connected through output peripheral interface 146.

Computer 102 may operate in a networked environment using logical connections to one or more remote computers, such as a remote server/computer 148. Remote computer 148 may include many or all of the elements and features described herein relative to computer 102.

Logical connections shown in FIG. 4 are a local area network (LAN) 150 and a general wide area network (WAN) 152. Such networking environments are commonplace in offices, enterprise-wide computer networks, intranets, and the Internet. When used in a LAN networking environment, the computer 102 is connected to LAN 150 via network interface or adapter 154. When used in a WAN networking environment, the computer typically includes a modem 156 or other means for establishing communications over the WAN 152. The modem, which may be internal or external, may be connected to the system bus 108 via the user input interface 140 or other appropriate mechanism.

In a networked environment, program modules depicted relative to the personal computer 102, or portions thereof, may be stored in a remote memory storage device. By way of example, and not limitation, FIG. 4 illustrates remote application programs 158 as residing on a memory device of remote computer 148. It will be appreciated that the network connections shown and described are exemplary and other means of establishing a communications link between the computers may be used.

An implementation of an exemplary computer 102 may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

It is apparent that there has been provided with this disclosure an approach for management of enterprise systems and applications using three-dimensional visualization technology. While the disclosure has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the invention.

What is claimed is:

1. A method of servicing an outsourced operation, the method comprising:

receiving, using a computer device, a packet header and a tuple-based data payload containing information technology (IT) resource data from a plurality of outsourced operation locations, wherein the IT resource data includes elements that the outsourced operation is managing, and wherein each outsourced operation location includes a holographic enterprise interface for sending the packet header and the tuple-based data payload;

aggregating, using the computer device, the IT resource data from the plurality of outsourced operation locations, wherein the aggregated IT resource data represents the outsourced operation;

creating, using the computer device, a three-dimensional simulation of the aggregated IT resource data;

using, using the computer device, the three-dimensional simulation of a data center to remotely service the outsourced operation;

providing through the three-dimensional simulation of the data center near-real time operational capability of one of physical machines, software, and processes of the plurality of outsource operation locations; and providing the near-real time operational capabilities of the outsource operation locations by using the IT resource information contained within each packet header and each tuple-based data payload and by using a holographic protocol architecture (HPA) to define the packet types.

2. The method of claim 1, wherein the element comprises one selected from a group consisting of: IT storage system, a computer system, a network system, and an application.

3. The method of claim 1, wherein the aggregating further comprising monitoring one of physical machines, software, and processes of the outsourced operation.

4. The method of claim 1, wherein the outsource operation includes a plurality of IT service providers.

5. The method of claim 1, wherein the plurality of outsource operation locations are one of task distributed and geographically distributed.

6. The method of claim 1, wherein the receiving comprises one of:

checking status of one of physical machines, software, and processes of the outsourced operation;

checking a metric of the outsourced operation; and implementing an operation of the outsourced operation.

7. The method of claim 6, wherein the status is one of utilization of a server, memory usage of a server, and number of transactions an application is supporting; and wherein the metric is one of response time of an application, and availability measurement of an application.

8. A system for servicing an outsourced operation, the system comprising:

a computer hardware device including:

a system for receiving a packet header and a tuple-based data payload containing information technology (IT) resource data from a plurality of outsourced operation locations, wherein the IT resource data includes elements that the outsourced operation is managing, and wherein each outsourced operation location includes a holographic enterprise interface for sending the packet header and the tuple-based data payload;

a system for aggregating the IT resource data from the plurality of outsourced operation locations, wherein the aggregated IT resource data represents the outsourced operation;

a system for creating a three-dimensional simulation of the aggregated IT resource data;

a system for using the three-dimensional simulation of a data center to remotely service the outsourced operation;

a system for providing through the three-dimensional simulation of the data center near-real time operational capability of one of physical machines, software, and processes of the plurality of outsource operation locations; and a system for providing the near-real time operational capabilities of the outsource operation locations by using the IT resource information contained within each packet header and each tuple-based data payload and by using a holographic protocol architecture (HPA) to define the packet types.

9. The system of claim 8, wherein the element comprises one selected from a group consisting of: IT storage system, a computer system, a network system, and an application.

10. The system of claim 8, wherein the system for aggregating further comprises a system for monitoring one of physical machines, software, and processes of the outsourced operation.

11. The system of claim 8, wherein the outsource operation includes a plurality of IT service providers.

12. The system of claim 8, wherein the plurality of outsource operation locations are one of task distributed and geographically distributed.

13. The system of claim 8, wherein the system for receiving comprises one of:

a system for checking status of one of physical machines, software, and processes of the outsourced operation;

a system for checking a metric of the outsourced operation; and a system for implementing an operation of the outsourced operation.

14. The system of claim 13, wherein the status is one of utilization of a server, memory usage of a server, and number of transactions an application is supporting; and wherein the metric is one of response time of an application, and availability measurement of an application.

15. A computer program comprising program code stored on a computer-readable non-transitory medium, which when executed, enables a computer system to implement a method of servicing an outsourced operation, the method comprising:

receiving a packet header and a tuple-based data payload containing information technology (IT) resource data from a plurality of outsourced operation locations, wherein the IT resource data includes elements that the outsourced operation is managing, and wherein each outsourced operation location includes a holographic enterprise interface for sending the packet header and the tuple-based data payload;

aggregating the IT resource data from the plurality of outsourced operation locations, wherein the aggregated IT resource data represents the outsourced operation;

creating a three-dimensional simulation of the aggregated IT resource data;

using the three-dimensional simulation of a data center to remotely service the outsourced operation;

providing through the three-dimensional simulation of the data center near-real time operational capability of one of physical machines, software, and processes of the plurality of outsource operation locations; and providing the near-real time operational capabilities of the outsource operation locations by using the IT resource information contained within each packet header and each tuple-based data payload and by using a holographic protocol architecture (HPA) to define the packet types.

16. A method of generating a system for servicing an outsourced operation, the method comprising:

providing a computer system operable to:

receive a packet header and a tuple-based data payload containing information technology (IT) resource data from a plurality of outsourced operation locations, wherein the IT resource data includes elements that the outsourced operation is managing, and wherein each outsourced operation location includes a holographic enterprise interface for sending the packet header and the tuple-based data payload;

aggregate the IT resource data from the plurality of outsourced operation locations, wherein the aggregated IT resource data represents the outsourced operation;

create a three-dimensional simulation of the aggregated IT resource data;

use the three-dimensional simulation of a data center to remotely service the outsourced operation;

provide through the three-dimensional simulation of the data center near-real time operational capability of one of physical machines, software, and processes of the plurality of outsource operation locations; and provide the near-real time operational capabilities of the outsource operation locations by using the IT resource information contained within each packet header and each tuple-based data payload and by using a holographic protocol architecture (HPA) to define the packet types.

* * * * *